United States Patent
Chacko et al.

(10) Patent No.: US 12,347,196 B2
(45) Date of Patent: Jul. 1, 2025

(54) SYSTEM AND METHOD FOR RECORDING, ORGANIZING, AND TRACING EVENTS

(71) Applicant: HCL Technologies Limited, New Delhi (IN)

(72) Inventors: Simy Chacko, Chennai (IN); Venkatesh Shankar, Chennai (IN); Ramesh Gurusamy, Chennai (IN); Vijay Kulandaisamy, Chennai (IN)

(73) Assignee: HCL Technologies Limited, New Delhi (IN)

( * ) Notice: Subject to any disclaimer, the term of this patent is extended or adjusted under 35 U.S.C. 154(b) by 619 days.

(21) Appl. No.: 17/703,351

(22) Filed: Mar. 24, 2022

(65) Prior Publication Data

US 2022/0319174 A1    Oct. 6, 2022

(30) Foreign Application Priority Data

Mar. 30, 2021    (IN) .............................. 202111014590

(51) Int. Cl.
*G06V 20/40*    (2022.01)
*G06F 16/34*    (2019.01)
(Continued)

(52) U.S. Cl.
CPC .............. *G06V 20/46* (2022.01); *G06F 16/34* (2019.01); *G06F 16/38* (2019.01); *G06F 40/40* (2020.01); *G06V 30/18* (2022.01); *G10L 15/00* (2013.01)

(58) Field of Classification Search
CPC ........ G06V 20/46; G06V 30/18; G06V 20/56; G06V 20/59; G06V 20/44; G06F 16/34;
(Continued)

(56) References Cited

U.S. PATENT DOCUMENTS 5,758,920 A    6/1998    Stephan
7,271,731 B2    9/2007    Fournier
(Continued)

FOREIGN PATENT DOCUMENTS

KR    20050080410 A    8/2005

OTHER PUBLICATIONS

Peter, Ziewer Navigational Indices and Full Text Search by Automated Analyses of Screen Recorded Data, E-Learn: World Conference on E-Learning in Corporate, Government, Healthcare, and Higher Education, 2004 in Washington, DC, USA ISBN 978-1-880094-54-9 Publisher: Association for the Advancement of Computing in Education (AACE), San Diego, CA.
(Continued)

*Primary Examiner* — Thai Q Tran
*Assistant Examiner* — Stephen R Smith
(74) *Attorney, Agent, or Firm* — Kendal M. Sheets

(57) ABSTRACT

A method and system for recording, organizing, and tracing events is disclosed. In some embodiments, the method includes obtaining real-time video data captured using a video capturing equipment. The real-time video data comprises a plurality of sequential image frames and audio data associated with each of a plurality of events. The method further includes extracting first timestamp data and first text data from each of the plurality of sequential image frames, extracting second timestamp data and second text data from the audio data, generating text data associated with each of the plurality of events based on the first timestamp data, the first text data, the second timestamp data, and the second text data, storing the generated text data for subsequent audit, and discarding the real-time video data associated with each of the plurality of events.

20 Claims, 4 Drawing Sheets

(51) Int. Cl.
*G06F 16/38* (2019.01)
*G06F 40/40* (2020.01)
*G06V 30/18* (2022.01)
*G10L 15/00* (2013.01)

(58) Field of Classification Search
CPC ......... G06F 16/38; G06F 40/40; G10L 15/00; G10L 15/26; G10L 25/54
USPC .............................. 386/241; 340/901; 704/4
See application file for complete search history.

(56) References Cited

U.S. PATENT DOCUMENTS

| | | | |
|---|---|---|---|
| 7,483,908 | B2 | 1/2009 | Seliger et al. |
| 9,514,225 | B2 | 12/2016 | Cho et al. |
| 9,602,738 | B2 * | 3/2017 | Choe ..................... G06F 16/738 |
| 10,298,832 | B2 * | 5/2019 | Boudreau ............... G01S 7/022 |
| 10,365,662 | B1 | 7/2019 | Hayward |
| 10,848,670 | B2 * | 11/2020 | Gatti ...................... B60R 25/33 |
| 10,930,144 | B2 * | 2/2021 | Miller ...................... G08G 1/04 |
| 2007/0080525 | A1 | 4/2007 | Mauriello |
| 2012/0102543 | A1 | 4/2012 | Kohli et al. |
| 2013/0246041 | A1 * | 9/2013 | Costa ...................... G06F 40/58 704/2 |
| 2014/0306833 | A1 * | 10/2014 | Ricci ...................... G06V 40/28 340/901 |
| 2015/0121441 | A1 | 4/2015 | Apte et al. |
| 2015/0332278 | A1 | 11/2015 | Garrido et al. |
| 2016/0253318 | A1 * | 9/2016 | Lee .......................... G06F 40/40 704/4 |
| 2016/0295089 | A1 | 10/2016 | Farahani |
| 2019/0392214 | A1 * | 12/2019 | Hagio ................... G06T 1/0007 |
| 2020/0302913 | A1 * | 9/2020 | Marcinkiewicz ....... G10L 15/02 |
| 2021/0223773 | A1 * | 7/2021 | Srinivasan ............... G05D 1/46 |
| 2023/0114524 | A1 * | 4/2023 | Neumann ........ G08B 13/19613 340/541 |

OTHER PUBLICATIONS

Anselm Spoerri, How to make audio/video as easy to use and share as text, Proceedings of the American Society for Information Science and Technology, Jan. 31, 2005, vol. 39, Issue1, Nov. 2002, pp. 270-278.

Drivermatics Limited, Drivermatics BlackBox Dash Cam 1.1.12 (https://drivermatics-blackbox-dash-cam.soft112.com/), May 31, 2017, Android.

Sonix AI, The best automated transcription software powered by cutting-edge AI (https://sonix.ai/features), 2022 Sonix, Inc., San Francisco.

Matt Richardson, Descriptive Camera™, 2012 (http://mattrichardson.com/Descriptive-Camera/).

* cited by examiner

SYSTEM AND METHOD FOR RECORDING, ORGANIZING, AND TRACING EVENTS

TECHNICAL FIELD

Generally, the invention relates to event monitoring and auditing. More specifically, the invention relates to system and method for recording, organizing, and tracing events from recorded video.

BACKGROUND

Currently, a wide range of video capturing devices that can be integrated with a vehicle dashboard are available in market. These video capturing devices are often referred to as dashcams. Some examples of currently available dashcams includes Garmin Dash Cam 46, Garmin Dash Cam Mini, Aukey 1080p Dash Cam, Nextbase 622GW, and so forth. The dashcams are integrated with dashboard of the vehicles in order to record external and sometimes internal video of the vehicles for subsequent audit or reference. For example, the recorded videos may help driver of the vehicle to avoid false allegations, to improve driving skills, and so forth. Further, the recorded videos may help insurance company to minimize fraudulent accidental claims, may help law enforcement agency in investigation, and so forth.

However, existing dashcams are limited in their scope, utility, and effectiveness. For example, existing dashcams record and store videos. This may be cause of distraction for drivers, may potentially invade privacy, or may consume a lot of storage space.

Therefore, there is a need of an efficient and reliable method and system for recording, organizing, and tracing events from the recorded video for subsequent use, audit or reference.

SUMMARY OF INVENTION

In one embodiment, a method of recording, organizing, and tracing events is disclosed. The method may include obtaining real-time video data captured using a video capturing equipment. It should be noted that the real-time video data comprises a plurality of sequential image frames and audio data associated with each of a plurality of events. The method may further include extracting first timestamp data and first text data from each of the plurality of sequential image frames. The method may further include extracting second timestamp data and second text data from the audio data. The method may further include generating text data associated with each of the plurality of events based on the first timestamp data, the first text data, the second timestamp data, and the second text data. It should be noted that generating the text data comprises correlating the first text data and the second text data based on the first timestamp data and the second timestamp data. The method may further include storing the text data associated with each of the plurality of events for subsequent audit. The method may further include discarding the real-time video data associated with each of the plurality of events.

In another embodiment, a system for recording, organizing, and tracing events is disclosed. The system includes an audit device comprising a processor and a memory communicatively coupled to the processor. The memory may store processor-executable instructions, which, on execution, may cause the processor to obtain real-time video data captured using a video capturing equipment. It should be noted that the real-time video data comprises a plurality of sequential image frames and audio data associated with each of a plurality of events. The processor-executable instructions, on execution, may further cause the processor to extract first timestamp data and first text data from each of the plurality of sequential image frames. The processor-executable instructions, on execution, may further cause the processor to extract second timestamp data and second text data from the audio data. The processor-executable instructions, on execution, may further cause the processor to generate text data associated with each of the plurality of events based on the first timestamp data, the first text data, the second timestamp data, and the second text data. It should be noted that generating the text data comprises correlating the first text data and the second text data based on the first timestamp data and the second timestamp data. The processor-executable instructions, on execution, may further cause the processor to store the text data associated with each of the plurality of events for subsequent audit. The processor-executable instructions, on execution, may further cause the processor to discard the real-time video data associated with each of the plurality of events.

In yet another embodiment, a non-transitory computer-readable medium storing computer-executable instruction for recording, organizing, and tracing events is disclosed. The stored instructions, when executed by a processor, may cause the processor to perform operations including obtaining real-time video data captured using a video capturing equipment. It should be noted that the real-time video data comprises a plurality of sequential image frames and audio data associated with each of a plurality of events. The operations may further include extracting first timestamp data and first text data from each of the plurality of sequential image frames. The operations may further include extracting second timestamp data and second text data from the audio data. The operations may further include generating text data associated with each of the plurality of events based on the first timestamp data, the first text data, the second timestamp data, and the second text data. It should be noted that generating the text data comprises correlating the first text data and the second text data based on the first timestamp data and the second timestamp data. The operations may further include storing the text data associated with each of the plurality of events for subsequent audit. The operations may further include discarding the real-time video data associated with each of the plurality of events.

BRIEF DESCRIPTION OF THE DRAWINGS

The present application can be best understood by reference to the following description taken in conjunction with the accompanying drawing figures, in which like parts may be referred to by like numerals.

DETAILED DESCRIPTION OF THE DRAWINGS

The following description is presented to enable a person of ordinary skill in the art to make and use the invention and is provided in the context of particular applications and their requirements. Various modifications to the embodiments will be readily apparent to those skilled in the art, and the generic principles defined herein may be applied to other embodiments and applications without departing from the spirit and scope of the invention. Moreover, in the following description, numerous details are set forth for the purpose of explanation. However, one of ordinary skill in the art will realize that the invention might be practiced without the use of these specific details. In other instances, well-known structures and devices are shown in block diagram form in order not to obscure the description of the invention with unnecessary detail. Thus, the invention is not intended to be limited to the embodiments shown but is to be accorded the widest scope consistent with the principles and features disclosed herein.

While the invention is described in terms of particular examples and illustrative figures, those of ordinary skill in the art will recognize that the invention is not limited to the examples or figures described. Those skilled in the art will recognize that the operations of the various embodiments may be implemented using hardware, software, firmware, or combinations thereof, as appropriate. For example, some processes can be carried out using processors or other digital circuitry under the control of software, firmware, or hard-wired logic. (The term "logic" herein refers to fixed hardware, programmable logic and/or an appropriate combination thereof, as would be recognized by one skilled in the art to carry out the recited functions.) Software and firmware can be stored on computer-readable storage media. Some other processes can be implemented using analog circuitry, as is well known to one of ordinary skill in the art. Additionally, memory or other storage, as well as communication components, may be employed in embodiments of the invention.

Figure 1:
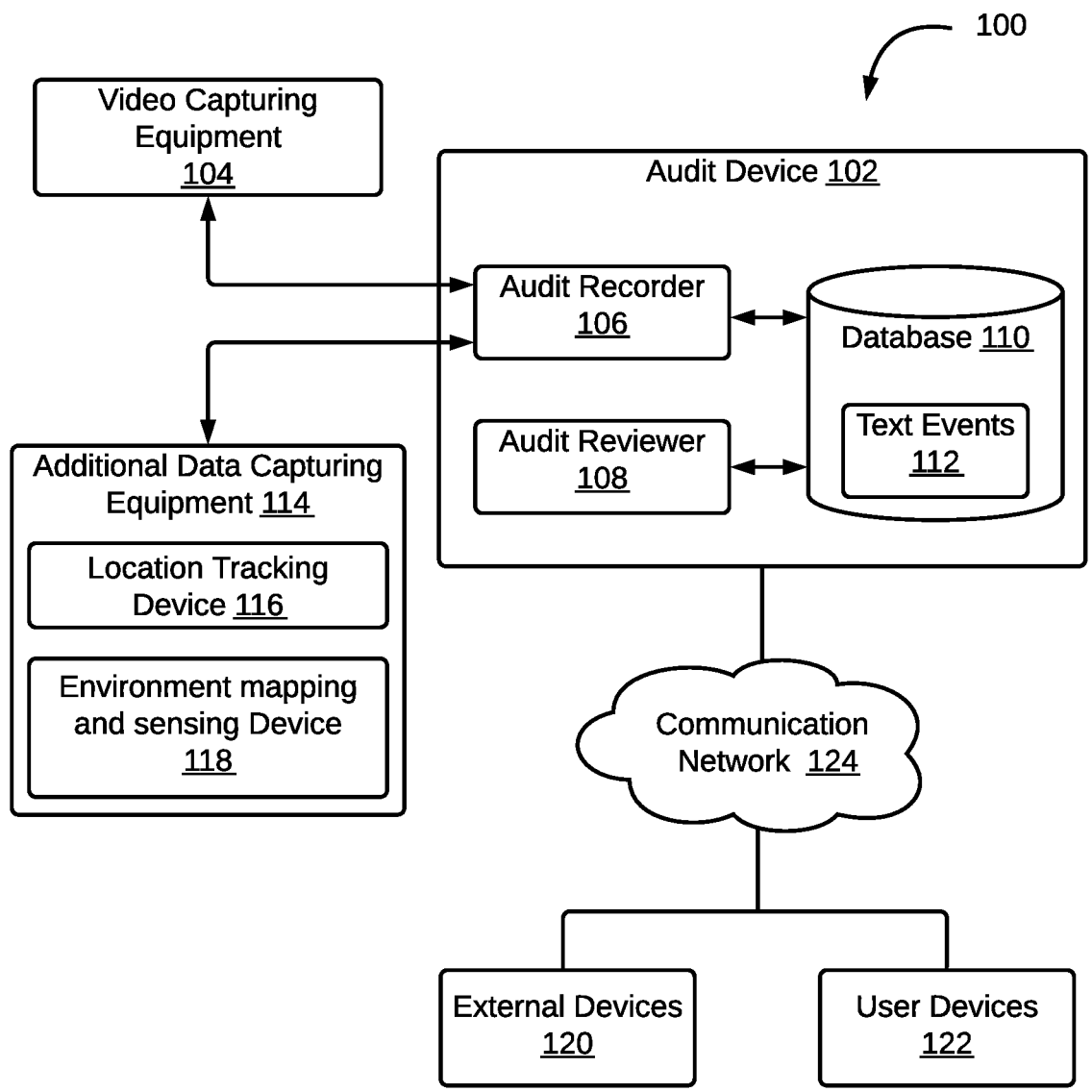
FIG. 1 illustrates a block diagram of an exemplary system for recording, organizing, and tracing events, in accordance with some embodiments of the present disclosure.

Referring now to FIG. 1, an exemplary system 100 for recording, organizing, and tracing events through an audit device 102, is illustrated, in accordance with some embodiments of the preset disclosure. In an embodiment, the audit device 102 may also be referred to as an audit device dashboard (ADD). In one embodiment, the audit device 102 may be integrated to a dashboard of a vehicle. Example of the vehicle may include an industrial vehicle, a public utility vehicle (e.g., an ambulance, a fire truck, etc.), a personal vehicle (e.g., car), a public transport vehicle (e.g., a public bus), and so forth. In another embodiment, the audit device 102 may be integrated with a dashboard present in an operation theatre of a hospital. The audit device 102 may facilitate rendering of a search report based on one or more text search keywords entered by a user. The search report may include a text data associated with at least one of a plurality of events.

In order to generate and render the search report to the user, initially, the audit device 102 may obtain real-time video data captured using a video capturing equipment 104. The video capturing equipment 104 may be co-located with or remote to the audit device 102. In an embodiment, the real-time video data captured may include a plurality of sequential image frames and audio data associated with each of a plurality of events. Further, the video capturing equipment 104 may be configured to capture scene in a form of video data within its field of view. Examples of such scenes may include, but is not limited to an internal environment or an external environment of the vehicle. In an embodiment, the video capturing equipment 104 may correspond to one of a video recording device, or a combination of a camera device, a microphone, and a storage device, and so forth.

In some embodiments, the audit device 102 may obtain additional data captured using one or more additional data capturing unit 114. The one or more additional data capturing unit 114 may be co-located with the video capturing equipment 104. The additional data captured may include a location data and third timestamp data, an environment data and fourth timestamp data, and so forth. The location data and the third timestamp data may be captured using a location tracking device 116. Examples of the location tracking device 116 may include, but is not limited to, GPS and satellite tracking, radio tracking, and radio frequency identification (RFID). Additionally, the environment data and the fourth timestamp data may be captured via an environment mapping and sensing device 118. Examples of the environment mapping and sensing device 118 may include, but is not limited to, short-range radar, lidar, and so forth. The environment data may include road condition data, weather data, number of people in the car or in operation theatre, and so forth.

Once the audit device 102 receives the real-time video data, an audit recorder 106 of the audit device 102 may be configured to extract first timestamp data and first text data from each of the plurality of sequential image frames. Further, the audit recorder 106 may extract second timestamp data and second text data from the audio data. Moreover, based on the first timestamp data, the first text data, the second timestamp data, and the second text data extracted, the audit recorder 106 may generate text data associated with each of the plurality of events. In order to generate the text data, the audit recorder 106 may correlate the first text data and the second text data based on the first timestamp data and the second timestamp data. The generated text data, the first timestamp data, and the second timestamp data may be stored in a database 110. In an embodiment, the text data may correspond to textual version of the events 112. It should be noted that, upon generation of the text data, the audit recorder 106 may discarding the real-time video data so as to save storage and ensure privacy. Moreover, in some embodiments, the audit recorder 106 may correlate the generated text data and the at least one of the location data and the environment data. The generated text data may be correlated with at least one of the location data and the environment data based on the first timestamp data, the second timestamp data and at least one of the third timestamp data and the fourth timestamp data, respectively. In such embodiments, the location data, the third timestamp data, the environment data, and the fourth timestamp data may also be stored in the database 110.

In an embodiment, the audit recorder 106 may be configured to perform a set of functions in order to generate the text data. The set of functions may include, but may not be limited to, Optical Character Recognition (OCR), object detection and recognition, Automatic Speech Recognition (ASR), location tracking, environment data mapping, speech or text translation, text correlation, video deletion, and text propagation. Each of the set of functions performed by the audit recorder 106 will be explained in greater detail in conjunction with FIG. 2.

Further, the text data generated based on correlation, may be send to an external device 120 via a communication network 124. The communication network 124, for example, may be any wired or wireless communication network and the examples may include, but may be not limited to, the Internet, Wireless Local Area Network (WLAN), Wi-Fi, Long Term Evolution (LTE), Worldwide Interoperability for Microwave Access (WiMAX), and General Packet Radio Service (GPRS). The external device 120 may be configured to store the text data associated with each of the plurality of events for subsequent use, audit, or review. In an embodiment, the external device 120 may correspond to a server based storage device. In such embodiments, the external device 120 may also be referred as a cloud storage device. The cloud storage device may be transient in nature. In other words, the cloud storage device may be periodically update based on frequency of occurrence of each of the plurality of events and a new event. In addition, once the text data is stored, the real-time video data associated each of the plurality of events may be discarded by the audit recorder 106.

Further, a user (e.g., an owner of the vehicle, insurance agent, law enforcement personnel, etc.) may access the text data stored in the audit device 102 or the external device 120, when required, via an audit reviewer 108. In some embodiments, the user may access the text data, via the audit reviewer 108, using a user device 122. Examples of the user device 122 may include, but is not limited to, a desktop, a laptop, a notebook, a netbook, a tablet, a smartphone, a remote server, a mobile phone, or another computing system/device. In such embodiments, the user may access the text data stored in the audit device 102 or the external device 120 via an application (e.g., mobile application) installed in the user device 122 or via a web browser client accessed from the user device 122.

In order to excess the text data, the user may enter one or more text search keywords. The one or more text search keywords may be entered via a graphical user interface (GUI) rendered by the audit device 102 itself, or one of the mobile application or the web browser client rendered on the user device 122. By way of an example, the one or more text search keywords may be associated with one of the plurality of events that the user wants to search information about. Further, the one or more text search keywords may be processed by a search engine within the audit reviewer 108. Upon processing the one or more text search keywords, the audit reviewer 108 may render the search report to the user. In an embodiment, the audit reviewer 108 may be configured to perform a set of functions in order to render the search report. The set of functions may include enabling search functionality and tracing events. Each of the set of functions performed by the audit reviewer 108 will be explained in greater detail in conjunction with FIG. 3.

By way of one example, suppose the audit device 102 is integrated with a dashboard of a vehicle. As stated above, the vehicle may correspond to any vehicle including an industrial vehicle, a public utility vehicle, a personal vehicle, and a public transport vehicle. In this case, the audit recorder 106 may be configured to obtain real-time video data associated with the vehicle. In present example, the real-time video data obtained may correspond to internal and external surrounding of the vehicle. Further, the real-time video data obtained may include a plurality of sequential image frames and audio data associated with each of a plurality of events. Examples of the plurality of events may include route information; travel history (i.e., source and destination of the vehicle); information of other vehicles that passed the vehicle; information associated with pharmacy, hospitals, police stations, etc. that are en route; running status of the vehicle; any accident associated the vehicle en route; interior status of the vehicle (e.g., status or condition of the onboard passengers); etc. Once the real-time video data and any additional data are obtained, the audit recorder 106 may generate text data associated to each of the plurality of events. Further, the generated text data may be stored in the external device 120 via the communication network 124. Once the text data associated with the plurality of events is stored in the external device 120, the real-time video data obtained may be discarded.

Now, suppose the user of the vehicle may want to know about information associated with a particular vehicle that passed the user's vehicle on a particular date at a particular time. In order to know such information, the user of the vehicle may enter one or more text search keywords via GUI of the audit device 102, or one of the mobile application or the web browser client rendered on the user device 122. In an embodiment, the one or more text search keywords may include travel history, the particular date, and an approximate time. Upon receiving the one or more text search keywords, the audit reviewer 108 may process the one or more text search keywords using the search engine. In an embodiment, in order to process the one or more text search keywords, the audit reviewer 108 may trace each of the plurality of events stored in a local storage device or the external device 120 based on the one or more text search keywords entered by the user. Further, based on processing of the one or more text search keywords, the audit reviewer 108 may generate and render the search report including information related to the vehicle that passed the user vehicle on that particular date and time.

By way of another example, suppose the audit device 102 may be integrated with a dashboard present in an operation theatre of a hospital. In this case, the audit recorder 106 of the audit device 102 may be configured to obtain real-time video data associated with one or more activities taking place inside the operation theatre. Further, the real-time video data obtained may include a plurality of sequential image frames and audio data associated with each of a plurality of events. Examples of plurality of events may include details of patient, current condition of the patient, surgery process adopted to perform surgery on the patient, number of doctors involved to perform surgery, tools utilized to perform surgery, temperature of room during surgery process, condition of patient after surgery, etc. Once the real-time video data and any additional data is obtained, the audit recorder 106 may generate text data associated to each of the plurality of events. It should be noted that the additional data may be obtained using one or more additional data capturing unit 114. As will be appreciated, in this case, the additional data may include environment data such as room temperature (captured using a temperature sensing device), lung pressure (captured using pressure sensing device in the ventilator), oxygen level (captured using oxygen level sensing device in the ventilator), and so forth. It should be noted that, the one or more additional data capturing unit 114 may include any sensing device available in the operation theatre that can be communicatively integrated with the audit device 102. Further, the generated text data may be stored in the external device 120 via the communication network 124. Once the text data associated with the plurality of events is generated, the real-time video data may be discarded so as to save on storage and protect the privacy.

Now, suppose the user (e.g., a head of a surgery department of the hospital) may want to review or audit the process adopted to perform surgery of the patient. In order to check process of surgery adopted, the user, may enter one or more text search keywords via the GUI of the audit device 102, or one of the mobile application or the web browser client rendered on the user devices 122. In an embodiment, the one or more text search keywords may include date of surgery performed, time of surgery performed, etc. Further, the one or more text search keywords entered by the user may be received by the audit reviewer 108 via the communication network 124. Upon receiving the one or more text search keywords, the audit reviewer 108 may process the one or more text search keywords using the search engine. In an embodiment, in order to process the one or more text search keywords, the audit reviewer 108 may trace each of the plurality of events stored in the external device 120 based on the one or more text search keywords entered by the user. Further, based on processing of the one or more text search keywords, the audit reviewer 108 may generate and render a search report related to process of surgery adopted to perform surgery.

Alternatively, suppose a remote expert consultant want to actively monitor and guide the surgery. In such case, the remote expert surgeon may efficient and effectively access the text report with details of all parameters and procedure so as to provide expert guidance during the surgery if he sees anything amiss.

Figure 2:
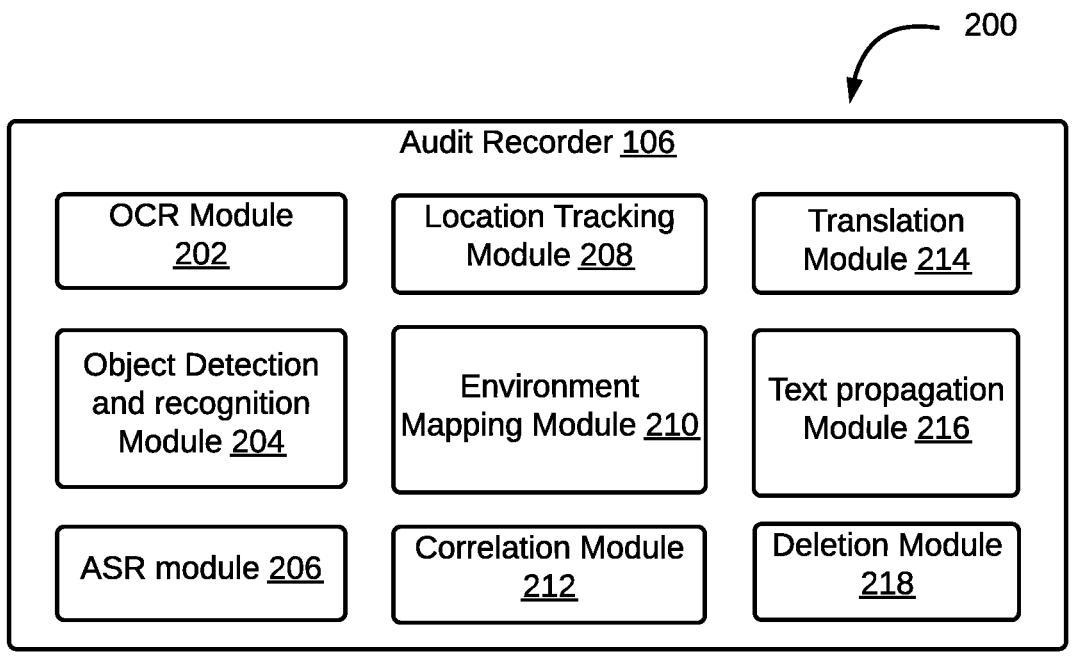
FIG. 2 illustrates a functional block diagram of an audit recorder of an audit device used for recording and organizing events, in accordance with some embodiments of the present disclosure.

Referring now to FIG. 2, a functional block diagram of an audit recorder 200 of an audit device used for recording, and organizing events is illustrated, in accordance with some embodiment of the present disclosure. As will be appreciated, the audit recorder 200 may be analogous to the audit recorder 106. As stated above, the audit recorder 200 may be configured to perform functions such as OCR, object detection and recognition, ASR, location tracking, environment data mapping, speech or text translation, text correlation, video deletion, text propagation, and so forth. In order to perform the above-mentioned functions, the audit recorder 106 may include a set of modules. The set of modules may include an Optical Character Recognition (OCR) module 202, an object detection and recognition module 204, an Automatic Speech Recognition (ASR) module 206, a location tracking module 208, an environment data mapping module 210, a correlation module 212, a translation module 214, a text propagation module 216, and a deletion module 218.

In an embodiment, the OCR module 202 may employ an OCR model to perform optical character recognition so as to generate text from image. The OCR module 202 may be configured to capture first timestamp data and first text data from each of the plurality of sequential image frames. The each of the plurality of sequential image frames may be extracted from the real-time video data obtained. In addition, each of the plurality of sequential image frames may be associated with the plurality of events. By way of an example, the OCR module 202 may be configured to capture information related to other vehicles (e.g., vehicle registration number, some text written on the vehicle, etc.) that passed the vehicle of the user, name of pharmacies or hospitals that are en route, etc. The information captured by the OCR module 202 may be used for subsequent audits in future.

The object detection and recognition module 204 may employ an object detection and recognition model to detect and recognize one or more objects from the image. Thus, similar to the OCR module 202, the object detection and recognition module 204 may be configured to capture the first timestamp data and the first text data from each of the plurality of sequential image frames. In other words, the object detection and recognition module 204 may augment the understanding derived from the real-time video data so as to extract the first timestamp data and the first text data. By way of an example, the objection detection and recognition module 204 may identify a type of vehicle, (e.g., the industrial vehicle, the public utility vehicle, the personal vehicle, etc.) that may have passed the user vehicle. By way of an example, the objection detection and recognition module 204 may identify an animal crossing the road that resulted in an accident. In addition, the object detection and recognition module 204 may allow the audit device 102 to act as a black box that can be referenced at any point in time.

Further, the ASR module 206 may be configured to extract second timestamp data and second text data from the audio data. The audio data may be captured from the real-time video data obtained. In addition, the audio data captured may be associated with the plurality of events.

The location tracking module 208 may be configured to receive location information from the location tracking device 116. Upon receiving the location information, the location tracking module 208 may be configured to extract location data and third timestamp data from the location information. By way of an example, the location data may enable tracing of movement of the vehicle. The movement information may include, but is not limited to, live location of the vehicle, deviation from route required to be followed by the vehicle, and previously travelled routes. In other words, the location tracking module 208 may track history of routes taken by the user vehicle.

The environment mapping module 210 may be configured to receive environment information from the environment sensing and mapping device 118. Upon receiving the environment information, the environment mapping module 210 may be configured to capture environment data and fourth timestamp. The environment data may include road condition data, weather data, number of people in the car or in operation theatre, temperature data, pressure data, oxygen level data, and so forth. By way of an example, the environment mapping module 210 may receive data from a radar and capture the road condition en route of the vehicle. Similarly, the environment mapping module 210 may capture weather data en route of the vehicle. Further, the road condition data along with the weather data may help an insurance agent to understand the condition under which the vehicle met with an accident. Alternatively, it may help a travel operator to plan alternative route for its vehicles plying that route.

The correlation module 212 may be configured to receive the first text data, the first timestamp data, the second text data and the second timestamp data from one of the OCR module 202, the object detection and recognition module 204, and the ASR module 206. Upon receiving the first text data, the first timestamp data, the second text data and the second timestamp data, the correlation module 212 may be configured to correlate the first text data and the second text data so as to generate the text data. The first text data and the second text data may be correlated based on the first timestamp data and the second timestamp data. Further, in some embodiments, the correlation module 212 may be configured to receive at least one of the location data along with the third timestamp data, and the environment data along with the fourth timestamp data. In such embodiments, the correlation module 212 may be configured to correlate the text data and the at least one of the location data and the environment data. The correlation may be performed based on the first timestamp data, the second timestamp data and at least one of the third timestamp data and the fourth timestamp data.

The translation module 214 may be configured to translate at least one of the first text data, the second text data, and the text data to a pre-defined language or a user-defined language. In other words, the translation module 214 may be configured to translate the text data generated in one or more languages to a pre-defined or user-defined language. By way of an example, the translation module 214 may translate the first text data and the second text data in one or more languages (e.g., first text data being German language as the car was driven in Germanic region and the second data being Spanish language as the occupant were Spain) for generating the text data in a pre-defined language (e.g., generated in English as the audit team of the car rental company are English speaking) or a user-defined language (e.g., generated in French language as law enforcement agency is French speaking).

The text propagation module 216 may be configured to receive the text data from one of the correlation module 212 and the translation module 214. Upon receiving the text data, the text propagation module 216 may be configured to propagate the generated or the translated text data to a server based storage device (also referred to as cloud based storage). As will be appreciated, in some embodiments, the text propagation module 216 may propagate the generated text data to a respective server based storage device based on pre-defined association. By way of an example, the audit devices installed in each ambulance of a particular fleet of ambulances associated with a hospital may propagate the generated or the translated text data to the server based storage device associated with that hospital. Alternatively, in some embodiments, the text propagation module 216 may propagate the generated text data along with an association tag to the server based storage device. By way of an example, the audit devices installed in each ambulance of a particular fleet of ambulances associated with a hospital may propagate the generated or the translated text data along with a tag for the associated hospital to the server based storage device. Once the text data is propagated to the server based storage device, the deletion module 218 may discard (delete or mark for deletion) the real-time video data from which the text data was derived.

Figure 3:
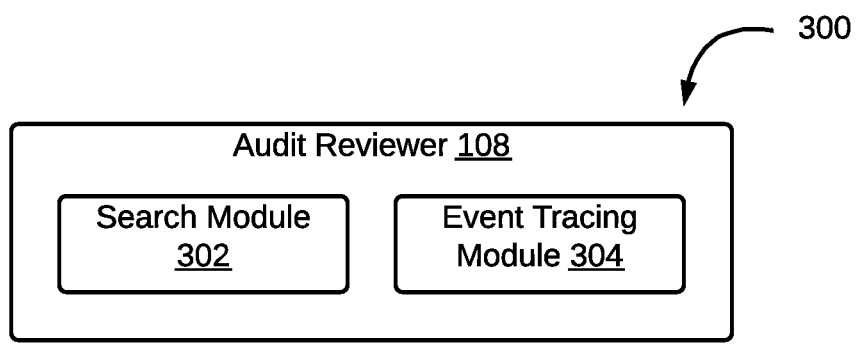
FIG. 3 illustrates a functional block diagram of an audit reviewer of an audit device used for tracing events, in accordance with some embodiments of the present disclosure.

Referring now to FIG. 3 a functional block diagram of an audit reviewer 300 of an audit device used for tracing events is illustrated, in accordance with some embodiments of the present disclosure. As will be appreciated, the audit reviewer 300 may be analogous to the audit reviewer 108. As stated above, the audit reviewer 108 may be configured to perform functions such as enabling search functionality, tracing events, and so forth. In order to perform the above-mentioned functions, the audit reviewer 108 may include a search module 302 and an event tracing module 304.

The search module 302 may be configured to receive one or more text search keywords entered by the user. In some embodiments, the search module 302 may render GUI in the audit device where the user may enter the one or more text search keywords. Additionally, in some embodiments, the search module 302 may interact with the mobile application or the web browser client rendered on the user device 122. As will be appreciated, the one or more text search keywords may be associated with at least one of the plurality of events. The at least one of the plurality of events may correspond to an event about which the user wants to gather information on. Further, the search module 302 may be configured to send the one or more text search keywords received from the user to the event tracing module 304.

The event tracing module 304 may be configured to receive the one or more text search keywords from the search module 302. Upon receiving the one or more text search keywords, the event tracing module 304 may be configured to trace at least one of the plurality of events associated with the one or more text search keywords received. In other words, the event tracing module 304 may implement a search engine to search textualized events based on the one or more text search keywords. Once the at least one event is traced, the event tracing module 304 may be configured to generate a search report associated with the one or more text search keywords. Thereafter, the event tracing module 304 may be configured to render the search report to the user via the search module 302.

It should be noted that the audit recorder 106 and/or the audit reviewer 108 may be implemented in programmable hardware devices such as programmable gate arrays, programmable array logic, programmable logic devices, or the like. Alternatively, the audit recorder 106 and/or the audit reviewer 108 may be implemented in software for execution by various types of processors. An identified engine/module of executable code may, for instance, include one or more physical or logical blocks of computer instructions which may, for instance, be organized as a component, module, procedure, function, or other construct. Nevertheless, the executables of an identified engine/module need not be physically located together but may include disparate instructions stored in different locations which, when joined logically together, comprise the identified engine/module and achieve the stated purpose of the identified engine/module. Indeed, an engine or a module of executable code may be a single instruction, or many instructions, and may even be distributed over several different code segments, among different applications, and across several memory devices.

As will be appreciated by those of ordinary skill in the art, a variety of processes may be employed for recording, organizing, and tracing events. For example, the exemplary system 100 and associated audit device 102 may record, organize and trace events, by the process discussed herein. In particular, as will be appreciated by those of ordinary skill in the art, control logic and/or automated routines for performing the techniques and steps described herein may be implemented by the system 100 and associated audit device 102, either by hardware, software, or combinations of hardware and software. For example, suitable code may be accessed and executed by the one or more processors on the system 100 or the associated audit device 102 to perform some or all of the techniques described herein. Similarly, application specific integrated circuits (ASICs) configured to perform some, or all of the processes described herein may be included in the one or more processors on the system 100 or the associated audit device 102.

Figure 4:
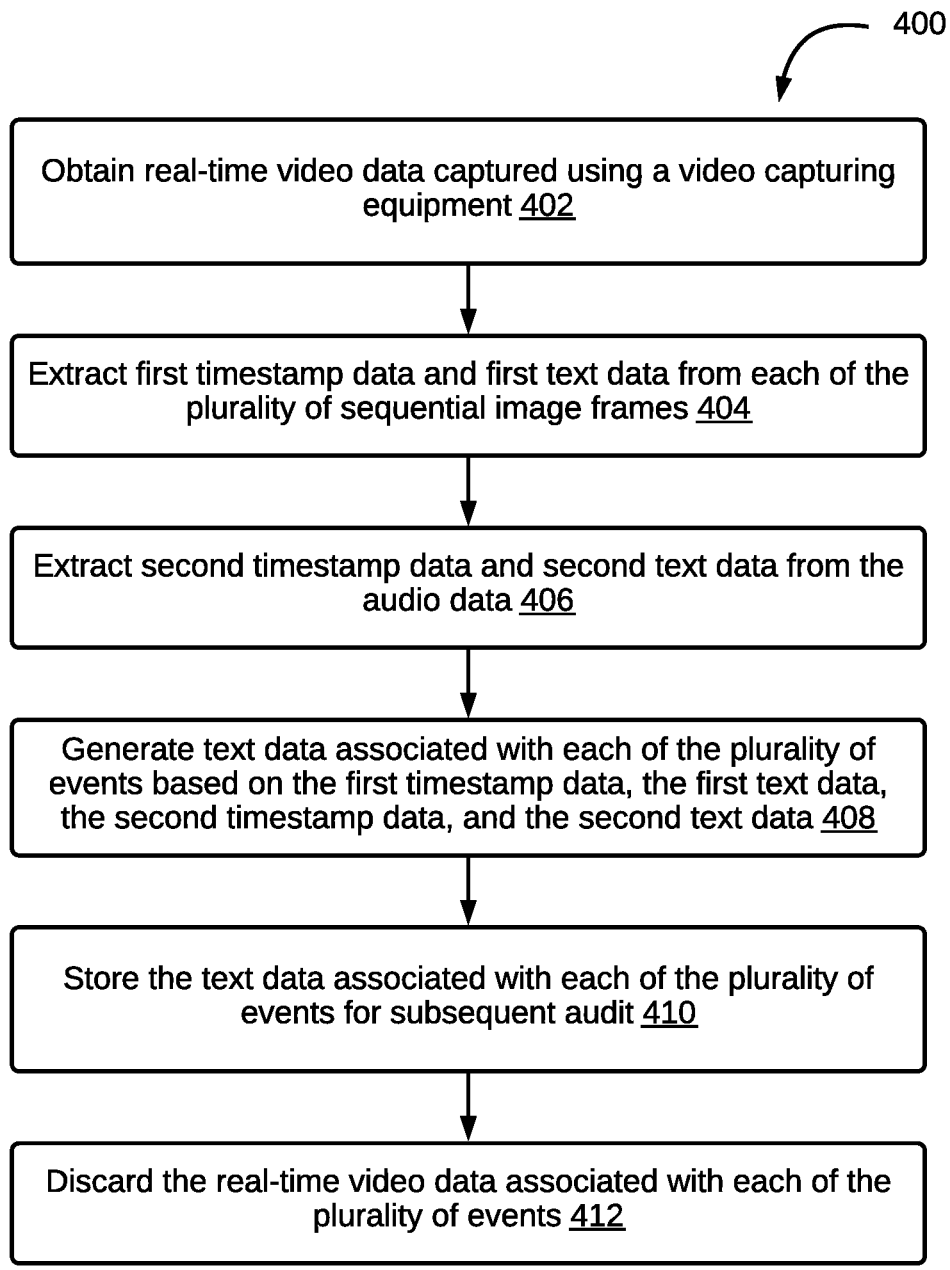
FIG. 4 illustrates a flowchart of a method for recording and organizing events, in accordance with some embodiments of the present disclosure.

Referring now to FIG. 4, a flowchart 400 of a method for recording and organizing events is illustrated, in accordance with some embodiment of the present disclosure. In reference to FIG. 1, steps disclosed in the flowchart 400 may be performed by the audit recorder 106 of the audit device 102. Moreover, in some embodiments, the audit device 102 and the video capturing equipment 104 may be integrated with a vehicle. In addition, in such embodiments, the video capturing equipment 104 may be configured to capture the real-time video data of at least one of: scene outside of the vehicle, or scene inside the vehicle.

At step 402, real-time video data may be captured using a video capturing equipment. In reference to FIG. 1, the video capturing equipment may correspond to the video capturing equipment 104. Examples of the video capturing equipment may include, but is not limited to, a video capturing device, a camera, and a microphone. Moreover, the real-time video data may include a plurality of sequential image frames and audio data associated with each of a plurality of events.

Once the real-time video data is obtained, at step 404, first timestamp data and first text data may be extracted from each of the plurality of sequential image frames. Further, at step 406, second timestamp data and second text data may be extracted from the audio data. In an embodiment, the first text data may be extracted by employing at least one of at least one of an optical character recognition (OCR) model and an object detection model. In reference to FIG. 2, the OCR model may be implemented by the OCR module 202. In addition, the object detection model may be implemented by the object detection and recognition module 204. Moreover, the second text data may be extracted by employing automatic speech recognition (ASR) model. In reference to FIG. 2, the ASR model may be implemented by the ASR module 206.

Upon extracting, the first timestamp data, the first text data, the second timestamp data, and the second text data, at step 408, text data associated with each of the plurality of events may be generated. It should be noted that, the text data may be generated based on the first timestamp data, the first text data, the second timestamp data, and the second text data. Moreover, in order to generate the text data, the first text data and the second text data may be correlated. In an embodiment, the first text data and the second text data may be correlated based on the first timestamp data and the second timestamp data. Further, the correlated first text data and the second text data may be concatenated to generate the text data.

In addition to the first text data and the second text data, an additional captured data may be obtained. The additional data may be obtained may be captured using one or more additional data capturing equipment. In reference to FIG. 1, the one or more additional data capturing equipment may correspond to the one or more additional data capturing unit 114. Moreover, the additional data may include a location data, third timestamp data, an environment data, and fourth timestamp data. The location data and the third timestamp data may be captured using a location tracking device. In reference to FIG. 1, the location tracking device may correspond to the location tracking device 116. Examples of the location tracking device may include, but is not limited to, GPS and satellite tracking, radio tracking, and RFID. Additionally, the environment data and the fourth timestamp data may be captured via an environment mapping and sensing device. Moreover, the environment data may include road condition data, weather data, number of people in car or in operation theater, and so forth. In reference to FIG. 1, the environment mapping and sensing device may correspond to the environment mapping and sensing device 118. Examples of the environment mapping and sensing device may include, but is not limited to, short-range radar, lidar, and so forth.

Further, the text data and the at least one of the location data and the environment data may be correlated. The text data and the at least one of the location data and the environment data may be correlated based on the first timestamp data, the second timestamp data and at least one of the third timestamp data and the fourth timestamp data. Thereafter, the at least one of the first text data, the second text data, and the text data may be translated to a pre-defined language or a user-defined language. By way of an example, suppose the at least one of the first text data, the second text data, and the text data may include multiple language. Then, in order to do internationalization, the at least one of the first text data, the second text data, and the text data may be converted in simple English language with tags for other different languages.

Thereafter, at step 410, the generated text data may be stored for subsequent audits. It should be noted that, the generated text data may be associated with each of the plurality of events. In reference to FIG. 1, the generated text data may be stored in the external device 120. Further, at step 412, the real-time video data associated with each of the plurality of events may be discarded. In an embodiment, the real-time video data may be discarded in order to ensure security. By way of an example, suppose a real-time video data obtained may correspond to a video of a passenger travelling in a vehicle. This real-time video obtained may be misused by user (e.g., the owner) of the vehicle. So, in order to avoid such misuse of the real-time video obtained, the real-time video may be discarded after generating the text data in order to ensure privacy and security of the passenger.

Figure 5:
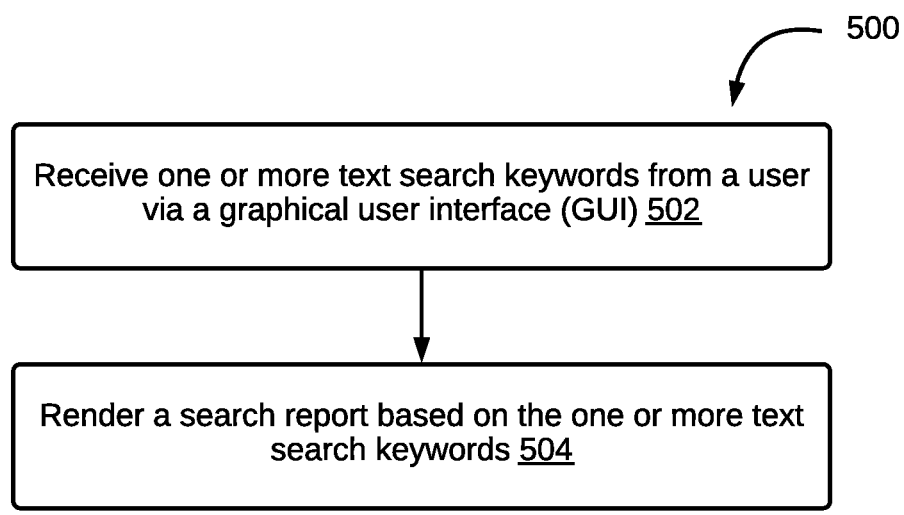
FIG. 5 illustrates a flowchart of a method of tracing events and rendering a search report to a user, in accordance with some embodiments of the present disclosure.

Referring now to FIG. 5, a flowchart 500 of a method of tracing events and rendering a search report to a user is illustrated, in accordance with some embodiments of the present disclosure. In reference to FIG. 1, steps disclosed in the flowchart 500 of present FIG. 5 may be performed by the audit reviewer 108 of the audit device 102. At step 502, one or more text search keywords may be received from a user. The user may send the one or more text search keywords via a graphical user interface (GUI). In reference to FIG. 1, the GUI may correspond to a GUI of one of the user devices 122. Moreover, the user may enter the one or more text search keywords using one of the mobile application or the web browser client rendered by the user device 122.

Upon receiving the one or more text search keywords, at step 504, a search report may be generated. In an embodiment, the search report may be generated based on the one or more text search keywords received from the user. Moreover, the search report may include the text data associated with at least one of the plurality of events. In addition, the at least one of the plurality of events may be determined based on a text search performed on the text data associated with each of the plurality of events. The text search may be performed on the text data using the one or more text search keywords.

Various embodiments provide method and system for recording, organizing, and tracing events. The disclosed method and system may obtain real-time video data captured using a video capturing equipment. The real-time video data may include a plurality of sequential image frames and audio data associated with each of a plurality of events. Moreover, the disclosed method and system may extract first timestamp data and first text data from each of the plurality of sequential image frames. Additionally, the disclosed method and system may extract second timestamp data and second text data from the audio data. Further, the disclosed method and system may generate text data associated with each of the plurality of events based on the first timestamp data, the first text data, the second timestamp data, and the second text data. Thereafter, the disclosed method and system may store the text data associated with each of the plurality of events for subsequent audit. In addition, the disclosed method and system may discard the real-time video data associated with each of the plurality of events.

The system and method provide some advantages like, the system and the method may require minimal configuration overhead for real-time video data captured. Moreover, the disclosed system and method may maximize security of the captured real-time video data and the stored text data. Further, the disclosed system and method provided may be robustly used for event traceability. In addition, the disclosed system and method when integrated with dashboard system may reduce overall storage space present in the dashboard system, without compromising data.

It will be appreciated that, for clarity purposes, the above description has described embodiments of the invention with reference to different functional units and processors. However, it will be apparent that any suitable distribution of functionality between different functional units, processors or at least may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Although the present invention has been described in connection with some embodiments, it is not intended to be limited to the specific form set forth herein. Rather, the scope of the present invention is limited only by the claims. Additionally, although a feature may appear to be described in connection with particular embodiments, one skilled in the art would recognize that various features of the described embodiments may be combined in accordance with the invention.

Furthermore, although individually listed, a plurality of means, elements or process steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather the feature may be equally applicable to other claim categories, as appropriate.

What is claimed is:

1. A method of recording, organizing, and tracing events, the method comprising:
    obtaining, by an audit device, real-time video data captured using a video capturing equipment, wherein the real-time video data comprises a plurality of sequential image frames and audio data associated with each of a plurality of events;
    extracting, by the audit device, first timestamp data and first text data from each of the plurality of sequential image frames;
    extracting, by the audit device, second timestamp data and second text data from the audio data;
    generating, by the audit device, text data associated with each of the plurality of events based on the first timestamp data, the first text data, the second timestamp data, and the second text data, wherein generating the text data comprises correlating the first text data and the second text data based on the first timestamp data and the second timestamp data;
    storing, by the audit device, the text data associated with each of the plurality of events for subsequent audit; and
    discarding, by the audit device, the real-time video data associated with each of the plurality of events.

2. The method of claim 1, wherein extracting the first text data comprises employing at least one of an optical character recognition (OCR) model and an object detection model, and wherein extracting the second text data comprises employing automatic speech recognition (ASR) model.

3. The method of claim 1, wherein generating the text data further comprises concatenating the first text data and the second text data based on the correlation.

4. The method of claim 1, further comprising:
    obtaining, by the audit device, additional data captured using one or more additional data capturing equipment, wherein the additional data comprises at least one of:
        location data and third timestamp data captured using a location tracking device, and
        environment data and fourth timestamp data using an environment mapping and sensing device, and wherein the environment data comprises at least one of road condition data and weather data; and
    correlating, by the audit device, the text data and the at least one of the location data and the environment data based on the first timestamp data, the second timestamp data and at least one of the third timestamp data and the fourth timestamp data.

5. The method of claim 1, further comprising translating, by the audit device, at least one of the first text data, the second text data, and the text data to a pre-defined language or a user-defined language.

6. The method of claim 1, further comprising:
    receiving, by the audit device, one or more text search keywords from a user via a graphical user interface (GUI); and
    rendering, by the audit device, a search report based on the one or more text search keywords, wherein the search report comprises the text data associated with at least one of the plurality of events, and wherein the at least one of the plurality of events is determined based on a text search performed on the text data associated with each of the plurality of events using the one or more text search keywords.

7. The method of claim 1, wherein the audit device and the video capturing equipment is integrated with a vehicle, and wherein the video capturing equipment is configured to capture the real-time video data of at least one of: scene outside of the vehicle, or scene inside the vehicle.

8. A system for recording, organizing, and tracing events, the system comprising:
    an audit device, wherein the audit device comprises:
    a processor; and
    a memory communicatively coupled to the processor, wherein the memory stores processor-executable instructions, which, on execution, causes the processor to:
        obtain real-time video data captured using a video capturing equipment, wherein the real-time video data comprises a plurality of sequential image frames and audio data associated with each of a plurality of events;
        extract first timestamp data and first text data from each of the plurality of sequential image frames;
        extract second timestamp data and second text data from the audio data;
        generate text data associated with each of the plurality of events based on the first timestamp data, the first text data, the second timestamp data, and the second text data, wherein generating the text data comprises correlating the first text data and the second text data based on the first timestamp data and the second timestamp data;
store the text data associated with each of the plurality of events for subsequent audit; and
discard the real-time video data associated with each of the plurality of events.

9. The system of claim 8, wherein extracting the first text data comprises employing at least one of an optical character recognition (OCR) model and an object detection model, and wherein extracting the second text data comprises employing automatic speech recognition (ASR) model.

10. The system of claim 8, wherein generating the text data further comprises concatenating the first text data and the second text data based on the correlation.

11. The system of claim 8, wherein the processor-executable instructions, on execution, further causes the processor to:
obtain additional data captured using one or more additional data capturing equipment, wherein the additional data comprises at least one of:
location data and third timestamp data captured using a location tracking device, and
environment data and fourth timestamp data using an environment mapping and sensing device, and wherein the environment data comprises at least one of road condition data and weather data; and
correlate the text data and the at least one of the location data and the environment data based on the first timestamp data, the second timestamp data and at least one of the third timestamp data and the fourth timestamp data.

12. The system of claim 8, wherein the processor-executable instructions, on execution, further causes the processor to:
translate at least one of the first text data, the second text data, and the text data to a pre-defined language or a user-defined language.

13. The system of claim 8, wherein the processor-executable instructions, on execution, further causes the processor to:
receive one or more text search keywords from a user via a graphical user interface (GUI); and
render a search report based on the one or more text search keywords, wherein the search report comprises the text data associated with at least one of the plurality of events, and wherein the at least one of the plurality of events is determined based on a text search performed on the text data associated with each of the plurality of events using the one or more text search keywords.

14. The system of claim 8, wherein the audit device and the video capturing equipment is integrated with a vehicle, and wherein the video capturing equipment is configured to capture the real-time video data of at least one of: scene outside of the vehicle, or scene inside the vehicle.

15. A non-transitory computer-readable medium storing computer-executable instructions for recording, organizing, and tracing events, the computer-executable instructions configured for:
obtaining real-time video data captured using a video capturing equipment, wherein the real-time video data comprises a plurality of sequential image frames and audio data associated with each of a plurality of events;
extracting first timestamp data and first text data from each of the plurality of sequential image frames;
extracting second timestamp data and second text data from the audio data;
generating text data associated with each of the plurality of events based on the first timestamp data, the first text data, the second timestamp data, and the second text data, wherein generating the text data comprises correlating the first text data and the second text data based on the first timestamp data and the second timestamp data;
storing the text data associated with each of the plurality of events for subsequent audit; and
discarding the real-time video data associated with each of the plurality of events.

16. The non-transitory computer-readable medium of the claim 15, wherein extracting the first text data comprises employing at least one of an optical character recognition (OCR) model and an object detection model, and wherein extracting the second text data comprises employing automatic speech recognition (ASR) model.

17. The non-transitory computer-readable medium of the claim 15, wherein generating the text data further comprises concatenating the first text data and the second text data based on the correlation.

18. The non-transitory computer-readable medium of the claim 15, wherein the computer-executable instructions are further configured for:
obtaining additional data captured using one or more additional data capturing equipment, wherein the additional data comprises at least one of:
location data and third timestamp data captured using a location tracking device, and
environment data and fourth timestamp data using an environment mapping and sensing device, and wherein the environment data comprises at least one of road condition data and weather data; and
correlating the text data and the at least one of the location data and the environment data based on the first timestamp data, the second timestamp data and at least one of the third timestamp data and the fourth timestamp data.

19. The non-transitory computer-readable medium of the claim 15, wherein the computer-executable instructions are further configured for:
translating at least one of the first text data, the second text data, and the text data to a pre-defined language or a user-defined language.

20. The non-transitory computer-readable medium of the claim 15, wherein the computer-executable instructions are further configured for:
receiving one or more text search keywords from a user via a graphical user interface (GUI); and
rendering a search report based on the one or more text search keywords, wherein the search report comprises the text data associated with at least one of the plurality of events, and wherein the at least one of the plurality of events is determined based on a text search performed on the text data associated with each of the plurality of events using the one or more text search keywords.

* * * * *